Oct. 27, 1970  O. RAUDSZUS  3,535,935
CIRCUIT ARRANGEMENT FOR ELECTRICAL CLINICAL THERMOMETER
Filed March 27, 1968  4 Sheets-Sheet 2

Fig. 3
Fig. 4
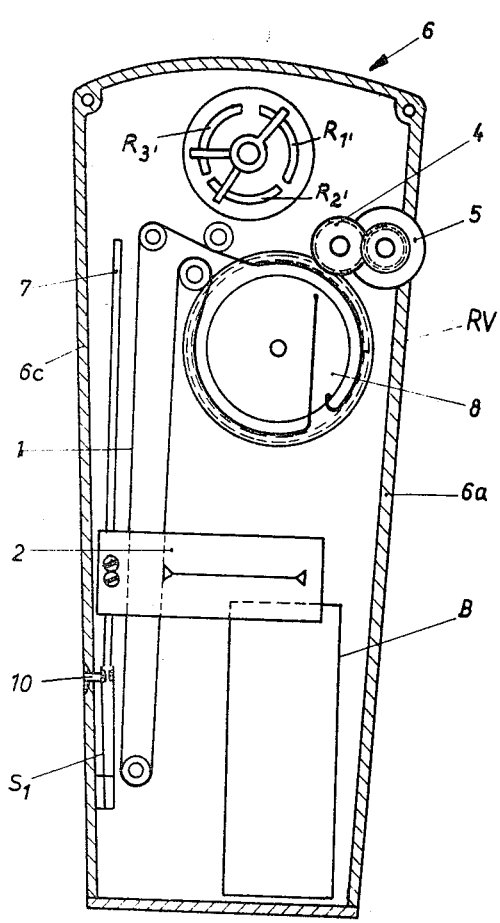
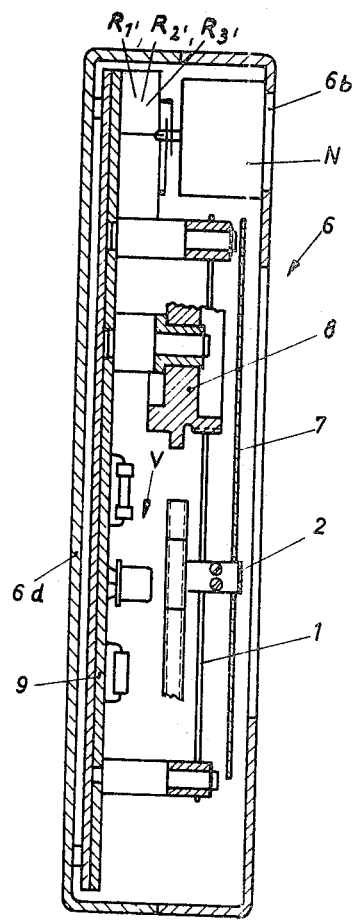

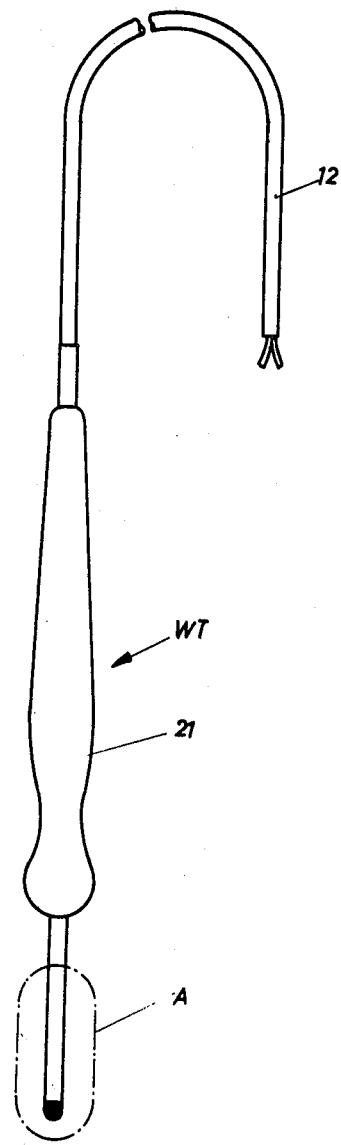
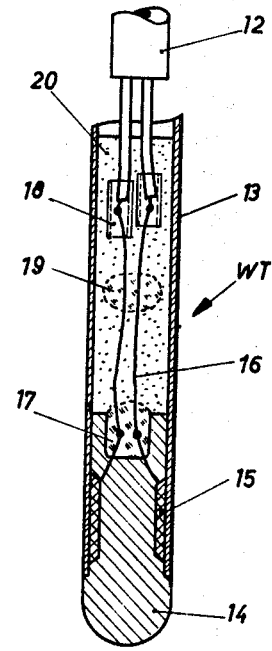
Fig.6
Fig.7

United States Patent Office 3,535,935
Patented Oct. 27, 1970

3,535,935
CIRCUIT ARRANGEMENT FOR ELECTRICAL CLINICAL THERMOMETER
Oswald Raudszus, Haus Giggenried,
8375 Ruhmannsfelden, Germany
Filed Mar. 27, 1968, Ser. No. 716,469
Int. Cl. G01k 7/20
U.S. Cl. 73—362      12 Claims

ABSTRACT OF THE DISCLOSURE

An electronic clinical thermometer having a bridge circuit in which one element of the bridge is the thermometer temperature sensing element. The bridge circuit is of the null balancing type and one of the bridge balancing impedances is located on a housing and connected to a scale pointer so that when it is adjusted to make the bridge give a null balance indication the pointer reads the temperature. The null balance can either be optically or aurally indicated.

This invention relates to electric clinical thermometers and circuit arrangements therefor comprising a temperature sensing element having a temperature-dependent internal resistance in a measuring circuit connectable to a source of current as well as an indicating instrument which is influenced by the measuring current produced by said resistance.

Electric clinical thermometers have been proposed which are equipped with temperature sensing elements in the form of thermocouples or platinum or nickel resistances. Since the voltage variations which can be achieved with the aforementioned sensing elements at a temperature range of approximately 7° Celsius are very low in view of the prescribed accuracy of measurement of at least 0.1° C., very sensitive and expensive galvanometers are needed as indicating instruments. Moreover, the accuracy tolerances for thermocouples and platinum or nickel resistances which are permissible in accordance with established standards and which actually can be achieved in practice are so great, that the accuracy of measurement required for clinical thermometers cannot be achieved.

Alternative temperature sensing elements used in other proposed electric clinical thermometers, are thermistors or thermally controlled resistors which, on account of large temperature coefficients and use in conjunction with an electronic amplifier, make possible a resolution in the temperature range in qeustion to 0.1° C. However, such thermal elements are subject to long-term drift so that the instruments do not comply with the Regulations for the Standardization of Weights and Measures for clinical thermometers.

Finally, in the case of electric clinical thermometers it has also been proposed that a transistor be provided as the temperature sensing element whose temperature dependent voltage occurring between the base and the emitter forms the controlling quantity for the indicating instrument. Through the current amplification of the transistor, for each degree of temperature a change in voltage of approximately 100 mv. can be achieved, which can be used to produce an indication in a measuring instrument of comparatively low sensitivity. However, especially on account of the high thermosensitivity of transistors, this temperature dependent voltage is also dependent upon manifold limiting quantities and changes in the course of time in the same manner as the amplification factor of the transistors. Therefore, such clinical thermometers using transistors as the sensing element do not comply with the applicable Regulations for the Standardization of Weights and Measures. Moreover, the accuracy of measurement of such an electric clinical thermometer using a transistor is guaranteed only if a constant and specific terminal voltage is present continuously from the source of current. This prerequisite is, however, present only in the very rarest instances.

The aim of the subject invention is to provide a circuit arrangement for an electric clinical thermometer in such a manner that it provides a substantially drift-free temperature indication, the accuracy of measurement of which complies with the Regulations for the Standardization of Weights and Measures for clinical thermometers and is largely independent of voltage fluctuations of the source of current.

In accordance with the present invention there is provided a circuit arrangement for electric clinical thermometers, comprising temperature sensing means having a temperature-dependent internal resistance in a measuring circuit connected to a source of current and to an indicating instrument which responds to a current dependent on the resistance of said temperature sensing means. In the present invention the sensing means is formed by a first resistive element of a measuring bridge which controls the current flowing in an indicating instrument via an indicator circuit and which sensing means has at least one correcting element coupled via driving elements to an indicating element movable relative to a reading scale.

Through the use, in accordance with the invention, of a measuring bridge circuit for electric clinical thermometers, a substantially drift-free temperature indication is ensured with an accuracy of measurement which is largely independent of the terminal voltage of the source of current. Moreover, due to the use of a null balancing circuit, the accuracy of measurement of the clinical thermometer of the present invention remains substantially uninfluenced by possible sensitivity variations of the indicating instrument, so that a comparatively cheap moving coil or moving magnet type indicator or an electronic indicator can be used. Then sensitivity of the measurement is also switchable from a coarse to a fine adjustment during the temperature measuring process in a simple manner through a change-over switch arranged on the clinical thermometer, so that the most exact measurement results can be achieved in the shortest time.

In accordance with a further feature of the circuit arrangement according to the invention the measuring bridge is arranged for operation from an alternating-current supply and is located at the input of an amplifier the output of which is connected to the indicating instrument. Through such an arrangement of the circuit, a very small supply voltage can be used for the measuring bridge, the indicator of which nevertheless shows a readily observable indication.

A change in the bridge-diagonal-voltage, which produces the temperature indication, also can readily be obtained from an oscillator, the oscillation frequency of which preferably lies in the audible sound-frequency range, connected as the source of current. A small loudspeaker or earphone, by itself or alternatively with one of the previously described other types of indicators, can thereby be used as an indicating instrument, depending on whether an optical or aural determination of the balance state of the measuring bridge is preferred.

It is also advantageous in the present invention to use a trimming resistance connected in series to at least one further resistive element of the measuring bridge. Such a construction of the further resistive element makes possible the rapid adjustment of the clinical thermometer as well as a simple correction of the unavoidable manufacturing tolerances of the temperature sensing element and of the spread in values of the temperature coefficients of the element.

Similarly the other resistive elements of the measuring bridge can also have serially connected trimming resistances which are adjustable independently of one another. Such additional trimming resistances make possible an extremely sensitive adjustment of the clinical thermometer for the substantially complete compensation of the respective manufacturing tolerances of all the measuring bridge elements.

An electric clinical thermometer having the circuit arrangement of the invention, can with advantage have a housing accommodating at least one correcting element of the measuring bridge, the oscillator, the source of current, an amplifier for operating the indicating instrument as well as the reading scale with the indicating element and the driving elements thereof. The components in the housing are connectable to the temperature sensing element and the housing is of elongated shape for grasping with one hand. The front of the housing has the reading scale for the indicating element, and at least one driving element of the indicating element is arranged so as to be accessible from the outside of the housing.

A clinical thermometer according to the invention can be constructed with small dimensions and can be simultaneously grasped and operated with one hand more especially if the one driving element, accessible from the outside of the housing, of the indicating element is arranged in the thumb region on one of the narrow longitudinal sides of the housing.

To correspond to the reading habit of mercury clinical thermometers, the reading scale is arranged running in the longitudinal direction of the housing.

In a preferred embodiment of the clinical thermometer employing a null balance circuit, the indicating instrument is formed by an optical null indicator and is arranged on the front of the instrument. Such an arrangement makes it possible, when balancing the measuring bridge, simultaneously to see the null indicator and the reading scale, so that the measured value is ascertainable in the shortest time.

The handling of the clinical thermometer in the present invention is substantially facilitated in that the housing is connected via a flexible connecting lead to the temperature sensing element. The aforementioned trimming resistance connected in series with the balancing resistor of the temperature sensing element also offers the possibility of compensating the resistance of the connecting lead when adjusting the clinical thermometer.

As already mentioned earlier, it is also possible in the case of a measuring bridge fed by alternating current to use a headphone as a null indicator. The headphone is preferably connected via a flexible line to a connector provided on the housing. As occasion demands, even two or more headphones can be connected to the connector.

So that current is drawn only during the temperature measuring time from the source of current, which by way of example can be a dry-cell battery or an accumulator which can be accommodated in the housing, a switch connected in series with the source of current, is arranged on the side of the housing opposite the driving element for the indicating element. Operation of the switch by the hand grasping the housing, by way of example the forefinger thereof, is thereby also possible.

In constructional respects it is also advantageous if the indicating element is shiftable on a slide rail arranged on one narrow longitudinal side of the housing and is movable by a cord drive associated with the driving elements. A mounting, arranged in such a manner, of the indicating element and its actuation by a cord drive leave a sufficiently large space in the housing for receiving the elements of the circuit arrangement and more especially for the source of current thereof in the form of a dry-cell or accumulator battery.

Regarding the construction of the temperature sensing element it is advantageous if this has a measuring head made of precious metal overhanging the free end of a thin-walled receiving tube which encloses a resistance winding which is connected to the lead going to the circuit in the housing. A measuring head arranged in this manner and having a resistance winding of metal or of a metal alloy, preferably platinum or nickel, ensures a very rapid attainment of the temperature-resistance equilibrium, for which a time interval of at the most 10 to 15 seconds is necessary in the case of rectal measurements. The measuring of the body temperature of patients is thereby substantially speeded up.

In an advantageous manner the measuring head is arranged at the end of a handle through which passes in the longitudinal direction the connecting lead. The measuring head is therefore easy to handle and simple to disinfect.

One exemplified embodiment of the invention is represented in the drawings, in which:

FIG. 3 shows a longitudinal section through the thermometer housing of FIG. 2, viewed from the front;

FIG. 4 shows a longitudinal section through the thermometer housing of FIG. 3, viewed from the side;

FIG. 6 shows a side elevation of the temperature sensing element provided for the clinical thermometer of FIGS. 2 to 4; and FIG. 7 shows a longitudinal cross-section, represented on an enlarged scale, through the individual item A of FIG. 6.

Figure 1:
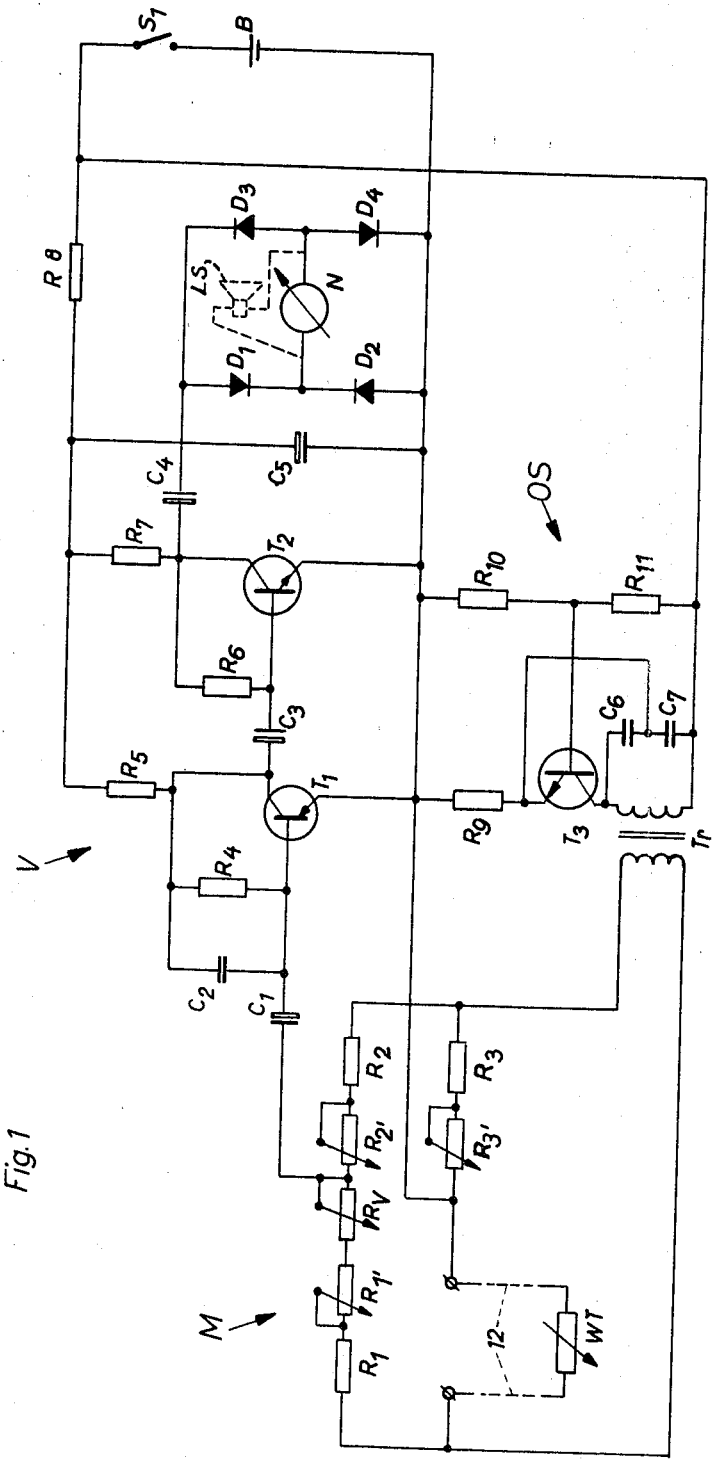
FIG. 1 shows a circuit diagram of an electric clinical thermometer in accordance with the invention.

A circuit arrangement suitable for an electric clinical thermometer has in accordance with FIG. 1 a temperature sensing element WT having a temperature-dependent internal resistance in a measuring circuit. The circuit is connectable via a switch S1 to a source of current, by way of example a dry-cell battery B and it has an indicating instrument N which can be influenced by the measuring current.

In accordance with the invention, the temperature sensing element WT forms a first resistive element and one arm of a measuring bridge M which controls the indicating instrument N in an indicator circuit. The bridge has further resistive elements R1 and R1' forming a second arm; R2 and R2' forming a third arm and R3 and R3' forming the fourth arm. An adjustable resistor RV is located in the second arm and is arranged as a correcting element and is as shown in FIG. 3, coupled via at least one driving element, by way of example a cord drive 1, to an indicating element in the form of a pointer 2. This latter is movable relative to an indicating scale, not shown in FIG. 3, but shown in FIG. 2, calibrated in degrees centrigrade from 35 to 42°.

The measuring bridge M with the first (WT) and fourth (R3) and the second (R1) and third (R2) arms lying opposite each other is designed for alternating-current feed applied across the junctions of the first and second and third and fourth arms from an oscillator OS. The output across opposing junctions of the first and fourth and second and third arms is applied via a DC voltage blocking capacitor C1 to the input of a conventional AC transistor amplifier V the output of which is connected to the indicating instrument N. This amplifier can be one-, two- or multi-stage and has, in the case of the circuit arrangement shown in FIG. 1, two amplifier stages which are provided with common emitter connected transistors T1, T2. The transistors are connected conventionally in circuit with capacitors C2–C5 and resistances R4–R8. The amplifier V drives indicating instrument N via rectifiers or diodes D1–D4 which form a full wave rectifier circuit for rectifying the A signals.

For the alternating-current voltage supply of the measuring bridge M, an oscillator OS is provided which has a transistor T3 and whose oscillation frequency lies, through a suitable choice of capacitors C6, C7 and resistances R9–R11, in the audible sound-frequency range. The oscillator is supplied power from the source of current B to the collector of transistor T3. Resistor R9 is the emitter return and base bias is supplied from the divider formed by resistors R10 and R11. The oscillator OS output is inductively coupled via a transformer Tr to opposing junctions of the measuring bridge M.

As can furthermore be seen from FIG. 1, at least one of the resistive elements of the measuring bridge M other than WT, but preferably each of the further resistive elements R1, R2, R3, has a series connected trimming resistance R1', R2', R3', each of which is adjustable independently of the other.

Figure 2:
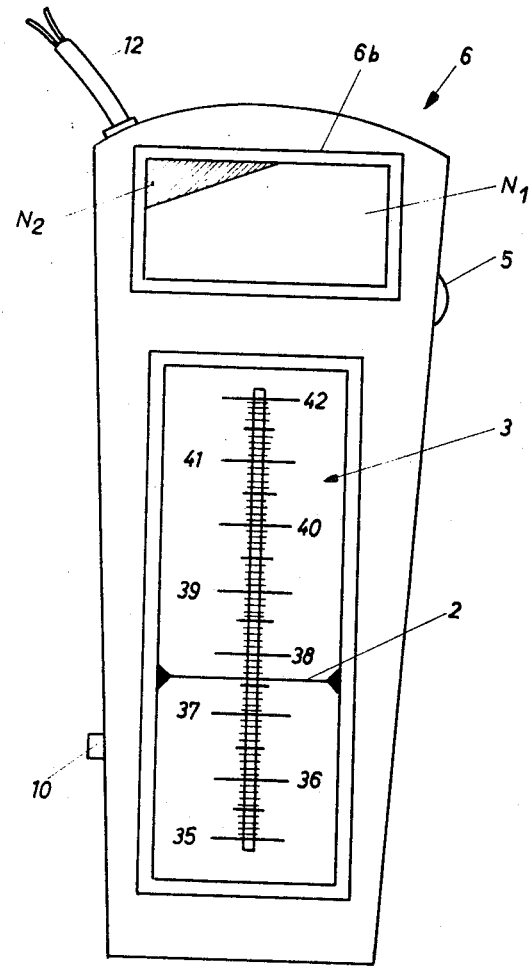
FIG. 2 shows a front elevation view of the thermometer housing containing the circuit shown in FIG. 1.

From FIGS. 2 to 4 it can be seen that the electric clinical thermometer has a housing 6 holding at least one correcting resistive element RV of the measuring bridge M, the source of current B and electronic circuit components such as the amplifier V, the indicating instrument N, or at least one connector for the latter when headphones are used. The housing also has the reading scale 3 with its pointer 2 and its drive cord 1 as well as further driving elements in the shape of drive pulleys 4, 5. The housing is oblong to permit grasping with one hand and is equipped on the front with the reading scale 3 for the position of the pointer 2, of whose driving elements at least one, the driving wheel 5, in the case of the represented embodiment, is accessible from the outside of the housing 6. The driving wheel 5 is arranged on the one narrow longitudinal side 6a of the housing exposed to the thumb of a hand grasping the housing. Above the reading scale 3, which extends in the longitudinal direction of the housing 6, there is provided in the front housing wall a window-like perforation 6b, behind which the indicating instrument N is arranged (see FIG. 2). The indicator N shown is an optical null indicator for the measuring bridge M of FIG. 1 which is a null balance circuit. In FIG. 2, indicator N has an indicating element or flag in the shape of a display surface N1 coupled to indicator drive means, e.g., the coil of a meter, on which surface an indicating area mark N2 is provided. Flag N1 travels, upon an unbalancing of the bridge M equilibrium, into the visual range of the window-like perforation 6b on the front housing wall.

Provided in the interior of the housing 6 in the region of the other narrow longitudinal side 6c there is a slide rail 7, along which the pointer 2 for reading scale 3 is shiftable by a cord drive 1. The latter is guided over pulleys adjacently to the slide rail 7 and to a cord pulley 8, which forms the adjustable part of the first correcting element RV of the measuring bridge M.

The remaining inside space of the housing 6 offers, through the lateral location of the slide rail 7, sufficient space for holding the dry-cell battery B as well as the amplifier V, which is of the printed circuit type and is located on a base plate 9 fastened on the rear housing wall 6d.

Figure 5:
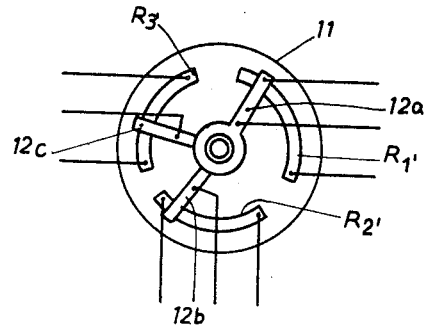
FIG. 5 shows a preferred constructional embodiment of three trimming resistors diagrammatically represented in FIG. 1.

The trimming resistance R1', R2', R3' represented diagrammatically in FIG. 1 comprise, according to FIG. 5, wire-wound resistances, which are arranged circularly on a common insulating base 11. Three mutually insulated sliders 12a, 12b, 12c are adjustable independently of one another on the associated trimming resistance. These resistors are wired in the circuit in the manner shown in FIG. 1.

A lead 12 (FIGS. 6 and 7) which is connected between the ends of the resistive elements R1 and R3' of the measuring bridge M to form the bridge input (see FIG. 1) and which is flexible is connected at one end to the temperature sensing element WT shown in FIGS. 1 and 7. The other end of lead 12 is from leads out of the housing 6 in which the bridge M is located. The temperature sensing element WT has a sensing head 14 which is made of a metal having good heat conducting properties, such as a precious metal, and which overhangs the free end of a tube 13 which carries a resistance winding 15 made of metal or of a metal alloy, preferably platinum or nickel, enclosed by the tube 13. Inside the tube 13, which is made of a corrosion-resistance and poorly heat-conducting material, by way of example $V_2A$-steel, the ends of the resistance winding 15 are welded to intermediate lines 16 and these are in turn welded to corresponding conductors carried by the connecting lead 12. The welding joints are respectively sealed in glass beads 17 or surrounded by insulating sleeves 18. A further glass bead 19 holds the intermediate lines 16 in the central longitudinal region. A casting-resin filling 20 the receiving tube 13 ensures a liquid-tight seal of the latter as well as a reliable impact resistance for the temperature sensing element WT. A handle 21 is provided through which the lead 12 runs in the longitudinal direction.

The housing 6 also contains switch S1 for the amplifier which is operated through a push-button accessible through a side wall of the housing. Operation of switch S1 selectively turns the circuit of FIG. 1 on and off.

The operation of the invention is described as follows. The temperature sensing element WT is located so that its end 14 is placed at the part of the patients, e.g., rectum, where temperature is to be sensed. S1 is actuated to turn on the oscillator and amplifier and knob 5 is turned to change the value of RV until a null balance is shown on indicator N. When the bridge is balanced, that is at null condition, the temperature is indicated on the scale 3 by the position of pointer 2 which is driven by the knob 5 controlling resistor RV.

The invention is not restricted to the embodiment represented in the drawings. Thus, it is by way of example possible in the case of a measuring bridge M having a null balance circuit, to provide instead of the indicating instrument N or additionally to the latter in the housing 6 a small loudspeaker (shown in dotted lines in FIG. 1 as LS) or a connector socket for an acoustic null indicator, by way of example an earphone. Equally, an optical null indicator formed by a pointer instrument having a center zero position can be used.

What is claimed is:

1. A circuit arrangement for electrical clinical thermometers comprising temperature sensing means having a temperature-dependent internal resistance, measuring bridge circuit means operable from a source of current and including means for indicating the operating condition of the bridge, means connecting said temperature sensing means in an arm of said bridge, variable impedance means connected in another arm of said circuit to adjust the operating condition of said bridge, a housing having a generally oblong shape for grasping by one hand holding said variable impedance means and said indicating means with said indicating means in a viewable position on the front of said housing, a reading scale with temperature indicia thereon also located on the front of said housing and a pointer movable adjacent said scale, driving means connected to said variable impedance and to said pointer and including a driving wheel which is accessible from outside said housing on a narrow longitudinal side of the housing, said driving means as said driving wheel is moved simultaneously changing the impedance value of said variable impedance means and the position of said pointer so that when said indicating means indicates a predetermined bridge operating condition the temperature measured is indicated by said pointer.

2. A circuit for an electric clinical thermometer as in claim 1 wherein said bridge is of the null balancing type.

3. A circuit arrangement as in claim 2, further comprising an oscillator for supplying alternating current to said measuring bridge, amplifier means having at least one-stage of amplification connected in series with said indicating means and the output of the bridge.

4. A circuit arrangement as in claim 3, wherein the oscillator has an oscillation frequency in the audible sound-frequency range and further comprising means for producing an audible representation of the operating condition of the bridge.

5. A circuit arrangement as in claim 1, wherein the arms of said bridge are formed by resistive elements and further comprising a compensating resistance connected in series to at least one resistive element of an arm of the bridge other than the arm containing the temperature sensing means.

6. A circuit arrangement as in claim 5, further comprising a compensating resistance connected to each of the arms of the bridge other than the arm containing the temperature sensing means, each of said resistances adjustable independently.

7. A clinical thermometer as in claim 1, wherein the reading scale is arranged running in the longitudinal direction of the housing.

8. A clinical thermometer as in claim 1, wherein the bridge circuit means is of the null balancing type, said indicating means comprising an optical null indicator located on the front of the housing.

9. A clinical thermometer as in claim 1, wherein a switch for connection in series with a source of current for the measuring bridge is located on the narrow longitudinal side of the housing opposite the side having the accessible portion of the driving wheel of the driving means.

10. A clinical thermometer as in claim 9, further comprising a slide rail arranged on one narrow longitudinal side of the housing and means including a drive cord for shifting the pointer on the slide rail.

11. A clinical thermometer as in claim 1, wherein the temperature sensing means comprises a thin-walled receiving tube with a resistance winding which is enclosed by the receiving tube, and a measuring head made of precious metal projecting beyond one end of the tube and which is connected to the measuring line.

12. A clinical thermometer as claimed in claim 11, wherein the resistance winding comprises a metal or a metal alloy, preferably platinum or nickel.

References Cited

UNITED STATES PATENTS

| | | |
|---|---|---|
| 1,411,396 | 4/1922 | Wilson et al. |
| 2,275,317 | 3/1942 | Ryder. |
| 2,657,580 | 11/1953 | Schroeder. |
| 2,703,833 | 3/1955 | Vanvor. |
| 2,971,379 | 2/1961 | Weisheit. |
| 3,339,414 | 9/1967 | Coor. |
| 3,348,415 | 10/1967 | Ash. |
| 3,360,715 | 12/1967 | Mueller. |
| 3,367,186 | 2/1968 | Ensign et al. |
| 3,377,862 | 4/1968 | Gheorghiu. |
| 2,049,285 | 7/1936 | Bauer. |
| 3,360,715 | 12/1967 | Mueller. |
| 3,431,781 | 3/1969 | Wiggin. |

OTHER REFERENCES

General Electric Thermistor Manual. Manual No. TH–13A, Aug. 15, 1956, Gen. Elect. Co. Metallurgical Prod. Div., Detroit, Cover, pp. 9, 10.

E. W. Schiemer, A Portable Temperature Indicator, Cheaspeake Bay Inst. of Johns Hopkins Univ. Technical Report 62–17, August 1962.

LOUIS R. PRINCE, Primary Examiner

F. SHOON, Assistant Examiner

UNITED STATES PATENT OFFICE
CERTIFICATE OF CORRECTION

Patent No. 3,535,935        Dated  Oct. 27, 1970

Inventor(s)  OSWALD RAUDSZUS

It is certified that error appears in the above-identified patent and that said Letters Patent are hereby corrected as shown below:

Column 1, after the title of the invention and identifying characteristics, insert --Priority is claimed under German application P 16 48 317.3, filed March 30, 1967.--

Column 5, line 73, delete "leads"; Col. 6, line 14, after "20" insert --in--.

SIGNED AND SEALED
MAR 2 1971

(SEAL)
Attest:

Edward M. Fletcher, Jr.
Attesting Officer

WILLIAM E. SCHUYLER, JR.
Commissioner of Patents